United States Patent [19]

Phillips

[11] E Re. 29,153

[45] Reissued Mar. 15, 1977

[54] CERTAIN N-PHENACYL PYRIDINIUM HALIDES

[75] Inventor: Wendell Gary Phillips, St. Louis, Mo.

[73] Assignee: Monsanto Company, St. Louis, Mo.

[22] Filed: Feb. 19, 1974

[21] Appl. No.: 443,554

Related U.S. Patent Documents

Reissue of:

[64] Patent No.: 3,776,916
Issued: Dec. 4, 1973
Appl. No.: 260,672
Filed: June 7, 1972

U.S. Applications:

[62] Division of Ser. No. 878,918, Nov. 21, 1969, Pat. No. 3,702,361.

[52] U.S. Cl. ..... 260/294.9; 260/250 A; 260/250 B; 260/250 BN; 260/251 R; 424/250; 424/251; 424/263

[51] Int. Cl.[2] ..... C07D 213/84

[58] Field of Search ..... 260/294.9, 297 R

[56] References Cited

UNITED STATES PATENTS

| | | | |
|---|---|---|---|
| 2,909,528 | 10/1969 | Shapiro et al. | 260/297 R |
| 3,206,383 | 9/1965 | Kappel | 260/297 R |

OTHER PUBLICATIONS

Bahner et al., J. Am. Chem. Soc. 73, pp. 3499–3500 (1951).
Bahner et al., J. Am. Chem. Soc. 74, p. 3960 (1952).
Kröhnke et al., Chem. Ber. 86, pp. 1554–1556 (1953).
Phillips et al., J. Org. Chem. 35(9), pp. 3144–3147 (1970).

*Primary Examiner*—G. Thomas Todd
*Attorney, Agent, or Firm*—Richard H. Shear; Donald W. Peterson

[57] ABSTRACT

Pyridinium, pyridazinium, pyrimidinium, and pyrazinium halides, respectively having an N-(phenacyl) substituent and the corresponding ylids obtained therefrom by alkaline treatment which compounds are useful as herbicides and/or insecticides.

4 Claims, No Drawings

CERTAIN N-PHENACYL PYRIDINIUM HALIDES

Matter enclosed in heavy brackets [ ] appears in the original patent but forms no part of this reissue specification; matter printed in italics indicates the additions made by reissue.

This is a division of application Ser. No. 878,918, filed Nov. 21, 1969, now U.S. Pat. No. 3,702,361 dated Nov. 7, 1971.

This invention relates to N-substituted heterocyclic compounds useful as herbicides and/or insecticides. These compounds are (1) N-(phenacyl) halides of the formula

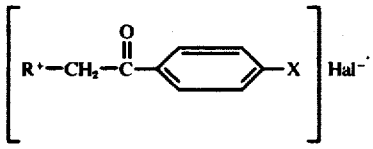

and (2) the corresponding ylids, which are obtained from (1) by alkaline treatment thereof, of the formula

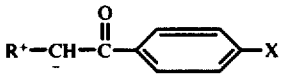

wherein "Hal" is halogen of atomic weight in the range of 35 to 127 (that is chlorine, bromine or iodine), wherein X is hydrogen, lower alkyl (that is methyl, ethyl, propyl or butyl and the various isomeric forms thereof) or lower alkoxy (that is methoxy, ethoxy, propoxy or butoxy and the various isomeric forms thereof), but preferably nitro, cyano or halogen of atomic weight in the range of 35 to 127 (that is chlorine, bromine or iodine), and wherein R is a nitrogen containing heterocyclic nucleus as exemplified by:

(A) pyridinium

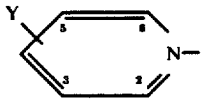

(B) pyridazinium

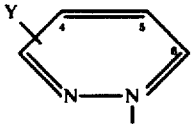

(C) pyrimidinium

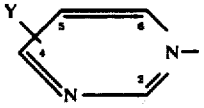

and (D) pyrazinium

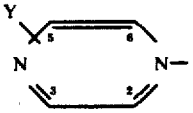

wherein Y is hydrogen, lower alkyl (that is methyl, ethyl, propyl or butyl and the various isomeric forms thereof), or lower alkoxy (that is methoxy, ethoxy, propoxy or butoxy and the various isomeric forms thereof), or acyl of the formula

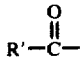

wherein R′ is lower alkyl (that is methyl, ethyl, propyl or butyl and the various isomeric forms thereof), or, and but preferably nitro, or halogen of atomic weight in the range of 35 to 127 (that is chlorine, bromine or iodine) or, and in particular, cyano, and wherein not more than one of X and Y is hydrogen. Preferably the moiety Y is in the 4-position.

The aforedescribed N-(phenacyl) halides (1) of this invention wherein "Hal" is chlorine or bromine are readily prepared by bringing together and heating to react substantially equimolecular proportions of a phenacyl halide of the formula

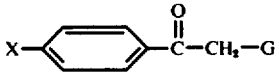

wherein G is halogen of atomic weight in the range of 35 to 80 (that is chlorine or bromine) and wherein X has the aforedescribed significance with the appropriate pyridine, pyridazine, pyrimidine or pyrazine of the formula RH wherein R and the Y moiety thereof have the aforedescribed significances in a suitable inert organic liquid media such as benzene, toluene, xylene, and the like, and thereafter recovering the product by conventional means such as simple filtration. The N-(phenacyl) halides (1) of this invention, wherein "Hal" is iodine are readily prepared by bringing together and reacting at about room temperature substantially equimolecular proportions of potassium iodide and a concentrated aqueous solution of the appropriate N-(phenacyl) chloride or bromide of this invention described immediately hereinbefore in the form of a concentrated aqueous solution thereof, the resultant iodide being less water-soluble than the said N-(phenacyl) bromide or chloride precipitates out and is recovered by simple filtration. These reactions can be represented as follows:

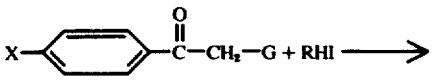

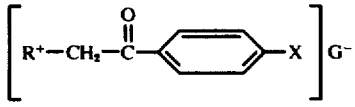

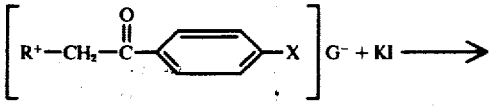

-continued

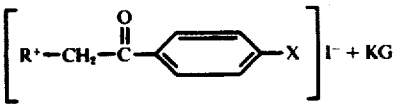

The aforedescribed ylids (2) of this invention are readily prepared by treatment of the aforedescribed halides (1) of this invention with dilute aqueous alkali such as aqueous sodium or potassium carbonate, or aqueous sodium or potassium hydroxide and preferably when the ylid product is water-soluble in the additional presence of an inert organic solvent therefor such as benzene or chloroform and the like. The ylids (2) of this invention have for convenience been set forth as being of the foregoing structural formula, however, they are characterized by a resonating structure which is exemplified as follows wherein $R^+$ is pyridinium as in (R) above:

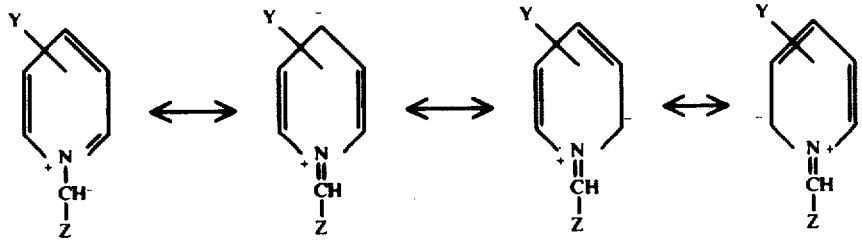

wherein Z is

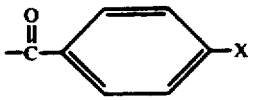

and wherein X and Y have the aforedescribed significances, and it is therefore to be understood that the ylids of this invention as described hereinabove and hereinafter in this specification and appending claims are not limited or bound by any particular theory regarding their specific resonating structural representations for each one functions the same as the others. The formation of the ylids (2) of this invention can be represented by the following:

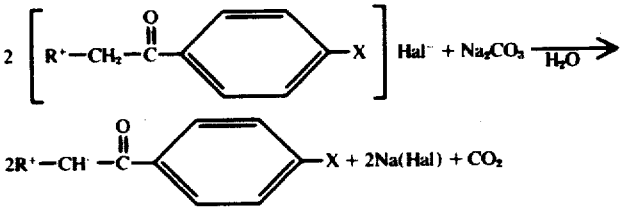

As illustrative of the preparation of the N-substituted heterocyclic compounds of this invention but not limitative thereof is the following:

EXAMPLE I

N-(4-methoxyphenyacyl) pyridinium bromide

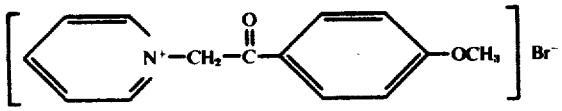

To a suitable reaction vessel equipped with an agitator and thermometer is charged approximately 7.9 parts by weight of pyridine, approximately 22.9 parts by weight of 4-methoxyphenacyl bromide and about 250 parts by weight of benzene. The so charged mass is agitated for about 16 hours at about room temperature, and thereafter the precipitate filtered off and dried. The product so obtained is N-(4-methoxyphenacyl) pyridinium bromide, a white solid melting at 208–210° C., and which is soluble in water.

EXAMPLE II

N-(4-chlorophenacyl)4-cyanopyridinium bromide

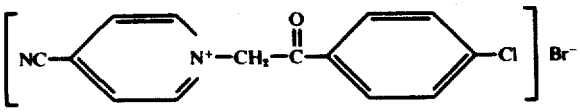

To a suitable reaction vessel equipped with an agitator and thermometer is charged approximately 45 parts by weight of 4-cyanopyridine, appoximately 100 parts by weight of 4-chlorophenacyl bromide and about 750 parts by weight of benzene. The so charged mass is agitated for about 12 hours at about 35° C., and thereafter the precipitate filtered off and dried. The product so obtained is N-(4-chlorophenacyl)-4-cyanopyridinium bromide, a white solid melting at 259–261° C., and which is soluble in water.

EXAMPLE III

N-(4-nitrophenacyl)pyridinium bromide

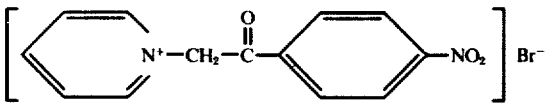

To a suitable reaction vessel equipped with an agitator and thermometer is charged approximately 33 parts by weight of pyridine, approximately 100 parts by weight of 4-nitrophenacyl bromide, and about 600 parts by weight of benzene. The so charged mass is agitated for about 16 hours at room temperature, and thereafter the precipitate filtered off and dried. The product is N-(4-nitrophenacyl) pyridinium bromide, a white solid melting at 255–257° C., and which is soluble in water.

EXAMPLE IV

Employing the procedure of Example II above but replacing 4-chlorophenacyl bromide with a substantially equimolecular amount of phenacyl bromide there is obtained N-(phenacyl) 4-cyanopyridinium bromide, a gray-white solid melting at 236–237° C., and which is soluble in water.

EXAMPLE V

Employing the procedure of Example I above but replacing 4-methoxyphenacyl bromide with a substantially equimolecular amount of phenacyl bromide and replacing pyridine with a substantially equimolecular amount of 4-tert.butylpyridine there is obtained N-(phenacyl) 4-tert.butylpyridinium bromide, a white solid melting at 247–248° C., and which is soluble in water.

EXAMPLE VI

Employing the procedure of Example I above but replacing 4-methoxyphenacyl bromide with a substantially equimolecular amount of phenacyl bromide and replacing pyridine with a substantially equimolecular amount of 4-acetylpyridine there is obtained N-(phenacyl) 4-acetylpyridinium bromide, a white solid melting at 214–215° C., and which is soluble in water.

EXAMPLE VII

Employing the procedure of Example II but replacing 4-cyanopyridine with a substantially equimolecular amount of 3-cyanopyridine and replacing 4-chlorophenacyl bromide with a substantially equimolecular amount of phenacyl bromide there is obtained N-(phenacyl) 3-cyanopyridinium bromide, a white solid soluble in water.

EXAMPLE VIII

Employing the procedure of Example I but replacing 4-methoxyphenacyl bromide with a substantially equimolecular amount of phenacyl bromide and replacing pyridine with a substantially equimolecular amount of 4-ethylpyridine there is obtained N-(phenacyl)4-ethylpyridinium bromide, a white solid melting at 236–238° C., and which is soluble in water.

EXAMPLE IX

Employing the procedure of Example II but replacing 4-chlorophenacyl bromide with a substantially equimolecular amount of 4-chlorophenacyl chloride there is obtained N-(4-chlorophenacyl)-4-cyanopyridinium chloride, a white solid soluble in water.

EXAMPLE X

Employing the procedure of Example III but replacing pyridine with a substantially equimolecular amount of 4-cyanopyridine and replacing 4-nitrophenacyl bromide with a substantially equimolecular amount of 4-nitrophenacyl chloride there is obtained N-(4-nitrophenacyl) 4-cyanopyridinium chloride, a white solid soluble in water.

EXAMPLE XI

Employing the procedure of Example II but replacing 4-chlorophenacyl bromide with a substantially equimolecular amount of 4-cyanophenacyl chloride there is obtained N-(4-cyanophenacyl) 4-cyanopyridinium chloride, a white solid soluble in water.

EXAMPLE XII

Employing the procedure of Example II but replacing 4-chlorophenacyl bromide with a substantially equimolecular amount of 4-tert.butylphenacyl chloride there is obtained N-(4-tert.butylphenacyl) 4-cyanopyridinium chloride, a white solid soluble in water.

EXAMPLE XIII

Employing the procedure of Example II but replacing 4-cyanopyridine with a substantially equimolecular amount of 4-nitropyridine there is obtained N-(4-chlorophenacyl) 4-nitropyridinium bromide, a white solid soluble in water.

EXAMPLE XIV

Employing the procedure of Example III but replacing pyridine with a substantially equimolecular amount of 4-chloropyridine there is obtained N-(4-nitrophenacyl) 4-chloropyridinium bromide, a solid soluble in water.

EXAMPLE XV

Employing the procedure of Example II but replacing 4-chlorophenacyl bromide with a substantially equimolecular amount of 4-iodophenacyl iodide there is obtained N-(4-iodophenacyl) 4-cyanopyridinium iodide, a solid soluble in water.

EXAMPLE XVI

Employing the procedure of Example II but replacing 4-chlorophenacyl bromide with a substantially equimolecular amount of 4-chlorophenacyl iodide there is obtained N-(4-chlorophenacyl) 4-cyanopyridinium iodide, a solid soluble in water.

EXAMPLE XVII

Employing the procedure of Example II but replacing 4-chlorophenacyl bromide with a substantially equimolecular amount of 4-isopropoxyphenacyl chloride there is obtained N-(4-isopropoxyphenacyl) 4-cyanopyridinium chloride, a solid soluble in water.

EXAMPLE XVIII

Employing the procedure of Example II but replacing 4-chlorophenacyl bromide with a substantially equimolecular amount of 4-methylphenacyl iodide there is obtained N-(4-methylphenacyl) 4-cyanopyridinium iodide.

EXAMPLE XIX

Employing the procedure of Example II but replacing 4-chlorophenacyl bromide with a substantially equimolecular amount of 4-cyanophenacyl chloride and replacing 4-cyanopyridine with a substantially equimolecular amount of 4-chloropyridine there is obtained N-(4-cyanophenacyl) 4-chloropyridinium chloride, a solid soluble in water.

EXAMPLE XX

Employing the procedure of Example III but replacing pyridine with a substantially equimolecular amount of 4-propionylpyridine there is obtained N-(4-nitrophenacyl) 4-propionylpyridinium bromide, a solid soluble in water.

EXAMPLE XXI

Employing the procedure of Example III but replacing pyridine with a substantially equimolecular amount of pyridazine there is obtained N-(4-nitrophenacyl) pyridazinium bromide, a white solid melting at 226–267° C., and which is soluble in water.

EXAMPLE XXII

Employing the procedure of Example III but replacing pyridine with a substantially equimolecular amount of pyrimidine there is obtained N-(4-nitrophenacyl) pyrimidinium bromide, a yellow solid melting at 187–188° C., and which is soluble in water.

EXAMPLE XXIII

Employing the procedure of Example I but replacing pyridine with a substantially equimolecular amount of pyridazine and replacing 4-methoxyphenacyl bromide with a substantially equimolecular amount of 4-chlorophenacyl chloride there is obtained N-(4-chlorophenacyl) pyridazinium chloride, a solid soluble in water.

EXAMPLE XXIV

Employing the procedure of Example II but replacing 4-cyanopyridine with a substantially equimolecular amount of 4-chloropyridine there is obtained N-(4-chlorophenacyl) 4-chloropyridinium bromide, a white solid soluble in water.

EXAMPLE XXV

Employing the procedure of Example II but replacing 4-cyanopyridine with a substantially equimolecular amount of 3-chloropyridazine there is obtained N-(4-chlorophenacyl) 3-chloropyridazinium bromide, a white solid soluble in water.

EXAMPLE XXVI

Employing the procedure of Example II but replacing 4-cyanopyridine with a substantially equimolecular amount of 3-cyanopyridazine there is obtained N-(4-chlorophenacyl) 3-cyanopyridazinium bromide, a solid soluble in water.

EXAMPLE XXVII

Employing the procedure of Example II but replacing 4-cyanopyridine with a substantially equimolecular amount of 5-bromopyrimidine there is obtained N-(4-chlorophenacyl) 5-bromopyrimidinium bromide, a solid soluble in water.

EXAMPLE XXVIII

Employing the procedure of Example III but replacing pyridine with a substantially equimolecular amount of 2-chloropyrimidine there is obtained N-(4-nitrophenacyl) 2-chloropyrimidium bromide, a solid soluble in water.

EXAMPLE XXIX

Employing the procedure of Example III but replacing pyridine with a substantially equimolecular amount of pyrazine there is obtained N-(4-nitrophenacyl) pyrazinium bromide, a white solid melting at 208–209° C., and which is soluble in water.

EXAMPLE XXX

Employing the procedure of Example I but replacing pyridine with a substantially equimolecular amount of 2-chloropyrazine there is obtained N-(4-methoxyphenacyl) 3-chloropyrazinium bromide, a solid soluble in water.

EXAMPLE XXXI

Employing the procedure of Example II but replacing 4-cyanopyridine with a substantially equimolecular amount of 5-cyanopyrimidine there is obtained N-(4-chlorophenacyl) 5-cyanopyrimidinium bromide, a solid soluble in water.

EXAMPLE XXXII

Employing the procedure of Example III but replacing 4-nitrophenacyl bromide with a substantially equimolecular amount of 4-cyanophenacyl chloride and replacing pyridine with a substantially equimolecular amount of 5-chloropyrimidine there is obtained N-(4-cyanophenacyl) 5-chloropyrimidinium chloride, a solid soluble in water.

In a similar manner the following N-substituted heterocyclic compounds of this invention are obtained from the appropriate phenacyl halide precursor and appropriate nitrogen containing heterocyclic precursor:

N-(4-bromophenacyl) 4-chloropyridinium chloride
N-(4-iodophenacyl) 4-chloropyridinium chloride
N-(4-iodophenacyl) 3-chloropyridinium iodide
N-(4-nitrophenacyl) 4-ethoxypyridinium chloride
N-(4-nitrophenacyl) 3-isobutoxypyridinium bromide
N-(4-nitrophenacyl) 4-chloropyridinium chloride
N-(4-cyanophenacyl) 3-chloropyridinium chloride
N-(4-chlorophenacyl) 4-iodopyridinium iodide
N-(4-nitrophenacyl) 4-nitropyridinium chloride
N-(4-nitrophenacyl) 3-methylpyridinium chloride
N-(4-chlorophenacyl) 4-chloropyridinium iodide
N-(4-cyanophenacyl) 3-bromopyridazinium chloride N-(4-nitrophenacyl) 4-isobutylpyridazinium bromide
N-(4-nitrophenacyl) 3-chloropyridazinium chloride
N-(4-chlorophenacyl) 3-chloropyridazinium bromide
N-(4-nitrophenacyl) 3-methylpyridazinium iodide
N-(4-tert.butylphenacyl) 3-chloropyridazinium iodide
N-(4-chlorophenacyl) 5-chloropyrimidinium chloride
N-(4-nitrophenacyl) 5-indopyrimidinium bromide
N-(4-nitrophenacyl) 4-chloropyrimidinium iodide
N-(4-nitrophenacyl) 2-chloropyrimidinium bromide
N-(4-chlorophenacyl) 2-cyanopyrazinium chloride
N-(4-nitrophenacyl) 2-cyanopyrazinium chloride
N-(4-cyanophenacyl) 2-chloropyrazinium chloride
N-(4-tert. butylphenacyl) 2-cyanopyrazinium chloride
N-(4-chlorophenacyl) 2-chloropyrazinium iodide, etc.

The ylids (2) of this invention as aforementioned are readily prepared by alkaline treatment of the corresponding N-(phenacyl) halides (1) and as illustrative thereof but not limitative thereof is the following:

EXAMPLE XXIII 4-cyanopyridinium 4-chlorophenacylylid

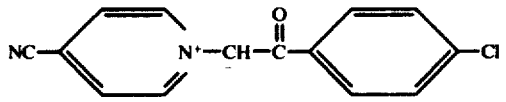

To a suitable reaction vessel equipped with a thermometer and agitator is charged an aqueous solution of approximately 8.4 parts by weight of N-(4-chlorophenacyl) 4-cyanopyrimidium bromide of Example II hereinbefore in approximately 500 parts by weight of water. While agitating the so charged mass approximately 100 parts by weight of a 10% by weight aqueous solution of potassium carbonate is added, and the mass agitated at room temperature for about four hours. The precipitate is filtered off and dried. The product is 4-cyanopyridinium 4-chlorophenacylylid, a reddish colored solid melting with decomposition at about 149° C.

EXAMPLE XXXIV 4-cyanopyridinium 4-nitrophenacylylid

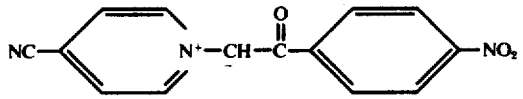

To a suitable reaction vessel equipped with a thermometer and agitator is charged approximately 0.2 part by weight of N-(4-nitrophenacyl) 4-cyanopyridinium bromide of Example X hereinbefore in approximately 50 parts by weight of anhydrous methanol. With agitation there is slowly added an equimolecular amount of sodium hydroxide in the form of a 0.10 N solution thereof. The precipitate is filtered off and dried. The product is 4-cyanopyridinium-4-nitrophenacylylid melting at 187–189° C.

EXAMPLE XXXV 4-cyanopyridinium 4-methoxyphenacylylid

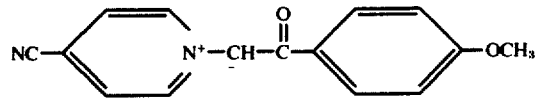

To a suitable reaction vessel equipped with a thermometer and agitator is charged approximately 6.5 parts by weight of N-(4-methoxyphenacyl) 4-cyanopyridinium bromide a white solid melting at 230–231° C., in approximately 200 parts by weight of water. With agitation there is added thereto approximately 100 parts by weight of a 10% by weight aqueous solution of potassium carbonate. The mass is agitated for about four hours at room temperature, filtered, and the precipitate dried. The product is 4-cyanopyridinium 4-methoxyphenacylylid, a dark red solid melting at about 128° C. with decomposition.

In a similar manner the following solid ylids are obtained from the N-(phenacyl) halides of the foregoing examples as itemized below:

| Ylid,obtained from | N-(phenacyl) halide of Example |
|---|---|
| Pyridinium4-methoxyphenacylylid | I |
| Pyridinium4-nitrophenacylylid | III |
| 4-cyanopyridinium phenacylylid | IV |
| 4-tert. butylpyridinium phenacylylid | V |
| 4-acetylpyridinium phenacylylid | VI |
| 3-cyanopyridinium phenacylylid | VII |
| 4-ethylpyridinium phenacylylid | VIII |
| 4-cyanopyridinium 4-chlorophenacylylid | IX |
| 4-cyanopyridinium 4-cyanophenacylylid | XI |
| 4-cyanopyridinium 4-tert. butylphenacylylid | XII |
| 4-nitropyridinium 4-chlorophenacylylid | XIII |
| 4-chloropyridinium 4-nitrophenacylylid | XIV |
| 4-cyanopyridinium 4-iodophenacylylid | XV |
| 4-cyanopyridinium 4-chlorophenacylylid | XIV |
| 4-cyanopyridinium 4-isopropoxyphenacylylid | XVII |
| 4-cyanopyridinium 4-methylphenacylylid | XVIII |
| 4-chloropyridinium 4-cyanophenacylylid | XIX |
| 4-propionylpyridinium 4-nitrophenacylylid | XX |
| pyridazinium 4-nitrophenacylylid | XXI |
| pyrimidinium 4-nitrophenacylylid | XXII |
| pyridazinium 4-chlorophenacylylid | XXIII |
| 4-chloropyridinium 4-chlorophenacylylid | XXIV |
| 3-chloropyridazinium 4-chlorophenacylylid | XXV |
| 3-cyanopyridazinium 4-chlorophenacylylid | XXVI |
| 5-bromopyrimidinium 4-chlorophenacylylid | XXVII |
| 2-chloropyrimidinium 4-nitrophenacylylid | XXVIII |
| Pyrazinium 4-nitrophenacylylid | XXIX |
| 3-chloropyrazinium 4-methoxyphenacylylid | XXX |
| 5-cyanopyrimidinium 4-chlorophenacylylid | XXXI |
| 4-chloropyrimidinium 4-cyanophenacylylid | XXXII |

In a similar manner the following ylids of this invention are obtained:

4-chloropyridinium 4-bromophenacylylid
4-chloropyridinium 4-iodophenacylylid
3-chloropyridinium 4-iodophenacylylid
4-ethoxypyridinium 4-nitrophenacylylid
3-isobutoxypyridinium 4-nitrophenacylylid
4-chloropyridinium 4-nitrophenacylylid
4-iodopyridinium 4-chlorophenacylylid
4-nitropyridinium 4-nitrophenacylylid
3-methylpyridinium 4-nitrophenacylylid
4-chloropyridinium 4-chlorophenacylylid
3-bromopyridazinium 4-cyanophenacylylid
4-isobutylpyridazinium 4-nitrophenacylylid
3-chloropyridazinium 4-nitrophenacylylid
3-chloropyridazinium 4-chlorophenacylylid 3-methylpyridazinium 4-nitrophenacylylid
3-chloropyridazinium 4-tert. butylphenacylid
5-chlorpyrimidinium 4-chlorophenacylylid
5-iodopyrimidinium 4-nitrophenacylylid
4-chloropyrimidinium 4-nitrophenacylylid
2-chloropyrimidinium 4-nitrophenacylylid
2-cyanopyrazinium 4-chlorophenacylylid
2-cyanopyrazinium 4-nitrophenacylylid
2-chloropyrazinium 4-cyanophenacylylid
2-cyanopyrazinium 4-tert. butylphenacylylid
2-chloropyrazinium 4-chlorophenacylylid, etc.

from the appropriate N-(phenacyl) halide (1) of this invention by alkaline treatment thereof.

A number of the N-substitituted heterocyclic compounds of this invention are new compounds, amongst which are the N-(phenacyl) halides of (1) and the ylids of (2) wherein "Hal" has the aforedescribed halogen significance and wherein R has the aforedescribed significances but preferably pyridinium and (a) wherein X is cyano, and the Y substitutent of R has the aforedescribed preferred significances;
(b) wherein X is nitro and the Y substitutent of R has the aforedescribed preferred significances, particularly cyano; and
(c) wherein X has the aforedescribed halogen significances, particularly chloro, and wherein the Y substitutent of R is acyl of the formula R'—CO— where R' is lower alkyl, nitro, cyano, or halogen of atomic weight in the range of 35 to 127 but preferably is cyano, e.g. particularly as in 4-cyanopyridinium;
(d) wherein X is lower alkoxy, wherein the Y substituent of R is cyano, particularly as in 4-cyanopyridinium.

The N-substituted heterocyclic compounds of this invention are herbicidally and/or insecticidally active. To illustrate such is the following:

(I) Various important crop plants are attacked by the larval stage of soil insects of the genus Diabrotica, for example, the northern corn rootworm, Diabrotica longicornis and the western corn rootworm, Diabrotica virgifera, which feed specifically on the root system of corn plants, the southern corn rootworm (or spotted cucumber beetle), Diabrotica undecimpunctata howardi which attacks cucurbits, peanut pods, and also roots of corn plants, and the banded cucumber beetle, Diabrotica balteata which attacks root systems of sweet potatoes. The larval stage of these insects attack or eat all of the smaller roots of infested plants and form tunnels in the larger roots, thereby weakening or destroying them. Corn plants growing in fields infested with the northern or western corn rootworms exhibit poor growth and often die and the larger plants because of their weakened root system often fall down during or after a heavy rainfall or a strong wind. In addition these soil insects seriously affect the quality of the harvested crop, particularly corn. One aspect of this invention is combating soil insects of this aforementioned genus Diabrotica which involves bringing into contact with the larval stage thereof, as for example, by applying to the host soil thereof such as cornfields, peanut fields, etc., an insecticidally effective amount of a N-substituted heterocyclic compound of the respective foregoing N-(phenacyl) halide and ylid formulae wherein "Hal" has the aforedescribed significance, wherein X is cyano, nitro or halogen of atomic weight in the range of 35 to 127 (that is chlorine, bromine or iodine) but preferably chlorine, wherein R has the aforedescribed significance but preferably pyridinium and which preferred embodiment when substituted with the moiety Y it being in the 4-position thereof, and wherein Y is hydrogen, cyano, nitro, or halogen of atomic weight in the range of 35 to 127 (that is chlorine, bromine or iodine) but preferably cyano. To illustrate the activity of this class of compounds but not limitative thereof is the following:

To a growth pouch (diSPo Seed-Pak growth pouch of Scientific Products Division of American Hospital Supply Corporation, Evanston, Ill.) in an upright position is added 20 ml. of distilled water. Thereafter is added 0.1 ml. of an acetone solution of known concentration in percent by weight of the compound to be evaluated as itemized below (for example an 0.1 ml. of an 0.1% by weight acetone solution of the compound provides a concentration of 5.0 p.p.m. thereof while 0.1 ml. of an 0.02% by weight acetone solution of the compound provides a concentration of 1.0 p.p.m. thereof). In the trough of the pouch formed by the paper wick thereof is placed two corn seeds (Zea maize, Hybrid U.S. 13) about one inch apart. Thereupon to the trough and between the seeds is added 8 to 12 ready-to-hatch species of Diabrotica corn rootworm eggs identified below, which eggs were washed (with distilled water) free of the soil in which they were incubated at room temperature for 21 days immediately prior to their placement in the trough. The so-charged growth pouch is then placed in an upright position in an incubator maintained at 80° F. and 70% relative humidity for 14 days. Thereupon the growth pouches are removed and the extent of kill in percent of the particular species of corn rootworm eggs observed. The observations were as follows:

| Compound | Concentration in p.p.m. | Percent kill of species WRC[1] | SRC[2] |
|---|---|---|---|
| 4-cyanopyridinium 4-chlorophenacylylid | 5.0 | | 50 |
| Do | 1.0 | 80 | |
| N-(4-bromophenacyl) pyridinium bromide | 5.0 | | 60 |
| Do | 1.0 | 40 | |
| N-(4-bromophenacy)pyridinium bromide | 5.0 | | 100 |
| Do | 1.0 | 70 | |
| Pyridinium phenacylylid | 5.0 | 0 | 0 |
| N-(phenacyl) 4-cyanopyridinium bromide | 5.0 | 0 | 0 |
| 3-bromopyridinium phenacylylid | 5.0 | 0 | 0 |
| 4-ethylpyridinium phenacylylid | 5.0 | 0 | 0 |
| Pyridinium 4-methoxyphenacylylid | 5.0 | 0 | 0 |
| N-(phenacyl) pyridinium bromide | 5.0 | 0 | 0 |
| N-(4-methoxyphenacyl) pyridinium bromide | 5.0 | 0 | 0 |
| N-(phenacyl) 4-acetylpyridinium bromide | 5.0 | 0 | 0 |
| N-(4-chlorophenacyl) 4-methylpyridinium bromide | 5.0 | 0 | 0 |
| N-(4-nitrophenacyl) 4-methylpyridinium bromide | 5.0 | 0 | 0 |

[1] WCR means the western corn rootworm species, Diabrotica virgifera
[2] SCR means the southern corn rootworm species, Diabrotica undecimpunctata howardi.

(II) The chewing insect larvae species of the genus Heliothis are destructive to a wide variety of vegetation during its active growth stage, particularly causing considerable damage to the leaves and foliage thereof. The larvae of the species Heliothis zea is known to be destructive to some eighty or more growing plant species and in particular growing cotton, hence the common name therefor "cotton bollworm." The larvae of the species Heliothis virescens, or tobacco budworm, is a well known pest in growing tobacco and cotton fields, particularly the former. One aspect of this invention is combatting these insects by systemically controlling them by applying to the plant environment (Systemic insecticides, as distinguished from general contact insecticides, are compounds which when applied to the soil around the plant or to a portion of the plant, for example the root system, are absorbed into the plant system and translocated to all growing parts of the plant. Insects and their larvae coming in contact with the plant and chewing same are affected by the compound or its metabolite which is present in the plant system. The term "plant environment" as used herein and in the appended claims is meant to include any part of the plant or the soil around the plant), as for example leaves or foliage of growing cotton, tobacco, etc., and surrounding soil or other growth media which are subject to infestation of the larval stage of the insects, an insecticidally effective amount of a N-substituted heterocyclic compound of the respective foregoing N-(phenacyl) halide (1) and ylid (2) formulae wherein "Hal" has the aforedescribed significance, wherein X is lower alkoxy, cyano or halogen of atomic weight in the range of 35 to 127 (that is chlorine, bromine or iodine) but preferably chlorine, wherein R has the aforedescribed significance but preferably pyridinium and which preferred embodiment when substituted with the moiety Y it being in the 4-position thereof, and wherein Y is cyano, nitro, or halogen of atomic weight in the range of 35 to 127 (that is chlorine, bromine or iodine) but preferably cyano. To illustrate the systemic activity of this class of compounds but not limitative thereof is the following:

To the soil surrounding 4-to-6 week old staked cotton seedlings (Rex smoothleaf variety) growing in methyl bromide fumigated light soil (Memphis silt loam) in 4" square plastic pots is applied at a rate in pounds per acre as indicated below of the compound to be evaluated as set forth below, wherein the compound is applied as a formulation thereof containing 1% by weight acetone solution of the said compound in admixture with distilled water in a ratio of approximately 17.5 parts of the water to one part of the said acetone solution and also containing per three parts of said acetone solution one part of a 10% aqueous solution of isooctylphenyl polyethoxy ethanol non-ionic surfactant. Two days after this soil application three 4-day old Heliothis zea larvae are individually placed and caged on separate leaves of the cotton seedlings. Forty eight (48) hours immediately after this placing and caging mortality observations are made. The results are as follows

| Compound | Rate in lbs./acre | Percent kill |
|---|---|---|
| 4-cyanopyridinium 4-chlorophenacylylid | 15 | 100 |
| 4-cyanopyridinium 4-methoxyphenacylylid | 10 | 60 |
| Pyridinium phenacylylid | 15 | 0 |
| N-(phenacyl) 4-cyanopyridinium bromide | 15 | 0 |
| 3-bromopyridinium phenacylylid | 15 | 0 |
| 4-ethylpyridinium phenacylylid | 15 | 0 |
| Pyridinium 4-methoxyphenacylylid | 15 | 0 |
| N-(phenacyl) pyridinium bromide | 15 | 0 |
| N-(4-methoxyphenacyl) pyridinium bromide | 15 | 0 |
| N-(4-chlorophenacyl) 4-methylpyridinium bromide | 15 | 0 |
| N-(4-nitrophenacyl) 4-methylpyridinium bromide | 15 | 0 |

-continued

| Compound | Rate in lbs./acre | Percent kill |
|---|---|---|
| N-(phenacyl) 4-acetylpyridinium bromide | 15 | 0 |

In the foregoing evaluation but at the perpetual stage of the insect Heliothis zea a good kill was observed employing N-(4-chlorophenacyl) 4-cyanopyridinium bromide at a rate of 15 lbs./acre.

Although the certain N-substituted heterocyclic compounds of this invention are useful per se in destroying Diabrotica and Heliothis larvae, it is preferable that they be supplied to the larvae or to the environment of the larvae in a dispersed form in a suitable extending agent. The exact concentration of these insecticidal compounds of this invention employed in destroying said larvae can vary considerably provided the required dosage (i.e. toxic or insecticidal amount) thereof is supplied to the larvae or to the environment of the larvae. When the extending agent is a liquid or mixture of liquids (e.g., as in solutions, suspensions, emulsions, or aerosols) the concentration of the insecticidal compound employed to supply the desired dosage generally will be in the range of 0.001 to 50 percent by weight. When the extending agent is a semi-solid or solid, the concentration of the insecticidal compound employed to supply the desired dosage generally will be in the range of 0.1 to 25 percent by weight. From a practical point of view, the manufacturer must supply the user with a low cost concentrate or spray base or particulate solid base in such form that, by merely mixing with water or finely divided inert solid extender (e.g. powdered clay or talc) or other low cost material available to the user at the point of use, he will have an easily prepared insecticidal spray or particulate solid. In such a concentrate composition, the insecticidal compound generally will be present in a concentration of 5 to 95 percent by weight, the residue being any one or more of the well known insecticidal adjuvants, such as the surface-active clays, solvents, diluents, carrier media, adhesives, spreading agents, humectants, and the like, but particularly a finely divided solid extender.

There are a large number of organic liquids which can be used for the preparation of solutions, suspensions or emulsions of the insecticidal compounds of this invention. For example, isopropyl ether, acetone, methyl ethyl ketone, octanone, dioxane, cyclohexanone, carbon tetrachloride, ethylene dichloride, tetrachloroethane, hexane, heptane and like higher liquid alkanes, hydrogenated naphthalenes, solvent naphtha benzene, toluene, xylene, petroleum fractions (e.g. those boiling almost entirely under 400° F., and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent, e.g., an aromatic hydrocarbon and an aliphatic ketone.

When the insecticidal compounds of this invention are to be supplied to the larvae or to the environment of the larvae as aerosols, it is convenient to dissolve them in a suitable solvent and disperse the resulting solution in dichlorodifluoromethene or like chlorofluoroalkane which boils below room temperature at atmospheric pressure.

The insecticidal compounds of this invention are preferably supplied to the larvae or to the environment of the larvae in the form of emulsions or suspensions. Emulsions or suspensions are prepared by dispersing the insecticidal compound of this invention either per se or in the form of an organic solution thereof in water with the aid of a water-soluble nonionic or anionic surfactant or mixtures thereof. The term "surfactant" as employed here and in the appended claims is used as in Volume II of Schwartz Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). The surfactants contemplated are the well-known capillary active substances which are nonionic or anionic and which are described in detail in volumes I and II of Schwartz, Perry and Berch's "Surface Active Agents and Detergents," (1958, Interscience Publishers, Inc., New York) and also in the November 1947 issue of Chemical Industries (pages 811–824) in an article entitled "Synthetic Detergents" by John W. McCutcheon and also in the July, August, September and October 1952 issues of Soap and Sanitary Chemicals under the title "Synthetic Detergents." The disclosures of these articles with respect to nonionizing capillary active substances are incorporated in this specification by reference in order to avoid unnecessary enlargement of this specification. The preferred surfactants are the water soluble anionic and nonionic surface active agents set forth in U.S. 2,846,398 (issued Aug. 5, 1958).

The insecticidal compound of this invention can be dispersed by suitable methods (e.g. tumbling or grinding) in solid extending agents either of organic or inorganic nature and supplied to the larvae environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. bentonite. These mixtures can be used for insecticidal purposes in the dry form, or by addition of water-soluble anionic or non-ionic surfactants the dry particulate solids can be rendered wettable by water so as to obtain stable aqueous dispersions or suspensions suitable for use as sprays.

For special purposes the insecticidal compounds of this invention can be dispersed in a semi-solid extending agent such a petrolatum with or without the aid of solubility promoters and/or surfactants.

In all of the forms described above the dispersions can be provided ready for use in combatting the larvae or they can be provided in a concentrated form suitable for mixing with or dispersing in other extending agents. As illustrative of a particularly useful concentrate is an intimate mixture of an insecticidal compound of this invention with a water-soluble anionic or non-ionic surfactant or mixtures thereof which lowers the surface tension of water in the weight proportions of 0.1 to 15 parts of surfactant with sufficient of the insecticidal compound of this invention to make 100 parts by weight. Such a concentrate is particularly adapted to be made into a spray for combatting various forms of the aforedescribed larvae by the addition of water thereto. As illustrative of such a concentrate is an intimate mixture of 20 parts by weight of 4-cyanopyridinium 4-chlorophenacylid and from 2 to about 4 parts by weight of a water-soluble non-ionic surfactant such as the polyoxyethylene derivatives of $C_8$–$C_{12}$ alkyl substituted phenols such as nonylphenol or dodecylphenol.

Another useful concentrate adapted to be made into a spray for combatting the aforedescribed larvae is a solution (preferably as concentrated as possible) of the insecticidal compound of this invention in an organic solvent therefor. The said liquid concentrate preferably contains dissolved therein a minor amount (e.g. 0.5 to 10 percent by weight of the weight of the new insecticidal agent) of a non-ionic or anionic surfactant which surfactant is also water-soluble. As illustrative of such a concentrate is a solution of 4-cyanopyridinium 4-chlorophenacylylid in a mixture of xylene and 2-octanone which solution contains dissolved therein a water-soluble non-ionic surfactant such as the polyoxyethylene derivatives of $C_{8-12}$ alkyl substituted phenols such as nonylphenol and dodecylphenol.

The insecticidal compounds of this invention can also be advantageously employed in combination with other pesticides, including, for example, nematocides, bactericides, fungicides, and herbicides. In this manner it is possible to obtain mixtures which are effective against a wide variety of pests and other forms of noxious life.

In the destruction of the aforedecribed larvae the insecticidal compound of this invention either per se or compositions comprising same are supplied to the larvae or to their environment in a toxic or insecticidal amount. This can be done by dispersing the new insecticidal agent or composition comprising same in, on or over an infested environment or in, on or over an environment the larvae frequent, e.g. agricultural soil or other growth media or other media attractable to the larvae for habitational or sustenance purposes, in any conventional fashion which permits the larvae to be subject to the insecticidal action of the insecticidal compounds of this invention. Such dispersing can be brought about by applying sprays or particulate solid compositions to a surface infested with the larvae or attractable to the larvae, as for example, the surface of an agricultural soil or other habitat media such as the above ground surface or host plants by any of the conventional methods, e.g., power dusters, boom and hand sprayers, and spray dusters. Also for sub-surface application such dispersing can be carried out by simply mixing the new insecticidal agent per se or insecticidal spray or particulate solid compositions comprising same with the infested environment or with the environment the larvae frequent, or by employing a liquid carrier for the new insecticidal agent to accomplish subsurface penetration and impregnation therein.

(III) A number of N-substituted heterocyclic compounds of the foregoing N-(phenacyl) halide (1) and ylid (2) formulae are pre-emergent and/or post-emergent herbicidally specific to certain broadleaf species, for example, (a) those of the foregoing formulae wherein "Hal" has the aforedescribed significance, wherein X is lower alkoxy but preferably methoxy, wherein R has the aforedescribed significance but preferably pyridinium, and wherein Y is hydrogen, nitro or halogen of atomic weight in the range of 35 to 127, but preferably hydrogen, and (b) those of the foregoing formulae wherein "Hal" has the aforedescribed significance, wherein X is hydrogen, lower alkyl, lower alkoxy, cyano, nitro, and halogen of atomic weight in the range of 35 to 127, but preferably hydrogen, wherein R has the aforedescribed significance but preferably pyridinum, and wherein Y is acyl of the formula

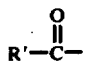

wherein R' is lower alkyl, preferably Y is in the 4-position of the pyridinium nucleus and is preferably acetyl, respectively, are post-emergent specific broadleaf herbicides. To illustrate such is the following:

The below itemized compounds, respectively, were applied at a concentration of 0.5 percent by weight and at rate of 10 pounds per acre to separate plots each having 14 day established growths of radish, sugar beet, pigweed, and soybean. An inspection of the respective plots conducted fourteen (14) days immediately after the respective spray applications revealed the following results:

| Compound/broadleaf species[1] | Radish | Sugar beet | Pig-weed | Soy-bean |
|---|---|---|---|---|
| N-(4-methoxyphenacyl) pyridinium bromide | 2 | 4 | 3 | 1 |
| N-(phenacyl) 4-methylpyridinium bromide | 0 | 0 | 0 | 0 |
| Pyridinium phenacylylid | 0 | 0 | 0 | 0 |
| N-(phenacyl)4-methylpyridinium bromide | 0 | 0 | 0 | 0 |
| N-(phenacyl) 4-tert. butylpyridinium bromide | 0 | 0 | 0 | 0 |
| N-(4-nitrophenacyl) pyridinium bromide | 0 | 0 | 0 | 0 |
| N-(4-bromophenacyl) pyridinium bromide | 0 | 0 | 0 | 0 |
| N-(4-chlorophenacyl) 4-methyl-pyridinium bromide | 0 | 0 | 0 | 0 |
| N-(4-nitrophenacyl) 4-methyl-pyridinium bromide | 0 | 0 | 0 | 0 |
| N-(phenacyl) 4-acetylpyridinium bromide | 0 | 4 | 1 | 1 |
| 4-cyanopyridinium 4-methoxyphenacylylid | 0 | 0 | 0 | 0 |

[1]The relative value of the compound evaluated with respect to its post-emergent herbicidal effect on each broadleaf plant species is indicated by a number as follows: 0=no growth inhibition; 1=slight growth inhibition; 2=moderate growth inhibition; 3=severe growth inhibition; 4=complete kill.

and (b) those ylids of the foregoing formulae wherein R has the aforedescribed significance but preferably pyridinium, wherein Y is lower alkyl but preferably tert. butyl, and wherein X is hydrogen, are pre-emergent broadleaf specific herbicides. To illustrate such is the following:

The below itemized compounds were individually incorporated in a good grade of top soil at a rate of 5 pounds per acre and thereafter separate plots thereof seeded with radish, soybean and tomato. Fourteen (14) days immediately after thus seeding in the greenhouse under ordinary conditions of sunlight and watering revealed the following results:

| Compound/broadleaf species[1] | Radish | Soybean | Tomato |
|---|---|---|---|
| 4-tert. butylpyridinium phenacylylid | 1 | 3 | 1 |
| 4-methylpyridinium phenacylylid | 1 | 3 | 0 |
| N-(phenacyl)4-tert. butylpyridinium bromide | 0 | 0 | 0 |
| N-(phenacyl) 4-methylpyridinium bromide | 0 | 0 | 0 |
| Pyridinium 4-methoxyphenacylylid | 0 | 0 | 0 |
| N-(4-bromophenacyl) pyridinium bromide | 0 | 0 | 0 |
| 4-cyanopyridinium 4-methoxyphenacylylid | 0 | 0 | 0 |
| 4-cyanopyridinium 4-chlorophenacylylid | 0 | 0 | 0 |

[1]The relative value of the compound evaluated with respect to its pre-emergent herbicidal effect on each broadleaf plant species is indicated by a number as follows: 0=no germination *inhibition*; 1=slight germination inhibition; 2=moderate germination inhibition; 3=severe germination inhibition.

What is claimed is:

[1. A N-substituted heterocyclic compound selected from the group consisting of (1) N-(4-halophenacyl) halides of the formula

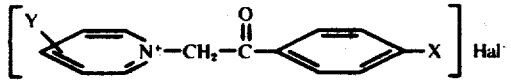

and (2) ylids of the formula

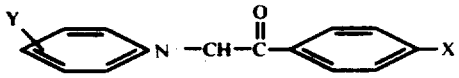

where "Hal" is halogen of atomic weight in the range of 35 to 127, X is halogen of atomic weight in range of 35 to 127, and Y is selected from the group consisting of nitro, cyano, halogen of atomic weight in the range of 35 to 127, and acyl of the formula

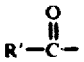

wherein R′ is lower alkyl.]

[2. A N-substituted heterocyclic compound selected from the group consisting of (1) N-(4-nitrophenacyl) halides of the formula

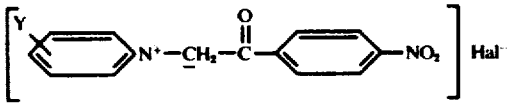

and (2) ylids of the formula

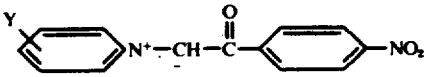

wherein "Hal" is halogen of atomic weight in the range of 35 to 127, and Y is selected from the group consisting of nitro, cyano, halogen of atomic weight in the range of 35 to 127, and acyl of the formula

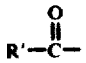

wherein R′ is lower alkyl.]

[3. A N-substituted heterocyclic compound selected from the group consisting of (1) N-(4-cyanophenacyl) halides of the formula

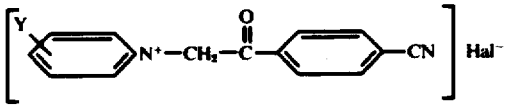

and (2) ylids of the formula

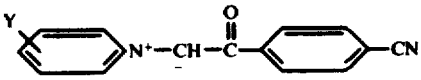

wherein "Hal" is halogen of atomic weight in the range of 35 to 127, and Y is selected from the group consisting of nitro, cyano and halogen of atomic weight in the range of 35 to 127, and acyl of the formula

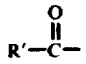

wherein R′ is lower alkyl.]

[4. A N-substituted heterocyclic compound selected from the group consisting of (1) N-(phenacyl) halides of the formula

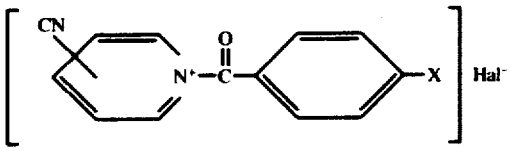

and (2) ylids of the formula

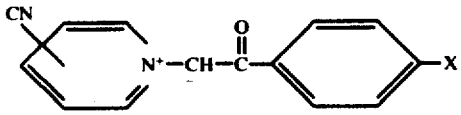

wherein "Hal" is halogen of atomic weight in the range of 35 to 127 and X is lower alkoxy.]

[5. A compound of claim 1 wherein X is chloro, and wherein Y is cyano and is in the 4-position of the pyridinium ring.]

[6. A compound of claim 5 which is N-(4-chlorophenacyl) 4-cyanopyridinium bromide.]

[7. A compound of claim 5 which is 4-cyanopyridinium 4-chlorophenacylylid.]

[8. A compound of claim 2 wherein Y is in the 4-position of the pyridinium ring.]

[9. A compound of claim 8 wherein Y is cyano.]

[10. A compound of claim 9 which is N-(4-nitrophenacyl) 4-cyanopyridinium bromide.]

[11. A compound of claim 9 which is 4-cyanopyridinium 4-nitrophenacylylid.]

[12. A compound of claim 4 which is 4-cyanopyridinium 4-methoxyphenacylylid.]

*13. An N-substituted heterocyclic compound selected from the group consisting of*

*(1) N-(4-cyanophenacyl) halides of the formula*

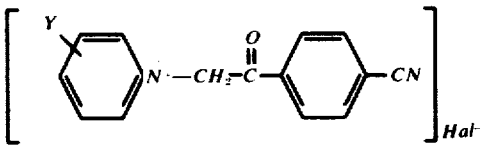

*and*

*(2) ylids of the formula*

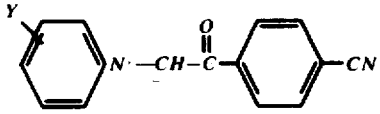

*wherein "Hal" is a halogen of the atomic weight in the range of 35 to 127, and Y is selected from the group*

*consisting of nitro, cyano and halogen of atomic weight in the range of 35 to 127, and acyl of the formula*

$$R'-\overset{\overset{O}{\|}}{C}-$$

*wherein R' is lower alkyl.*

*14. A compound according to claim 13 wherein Y is in the 4 position of the pyridinium ring.*

*15. A compound according to claim 13 wherein Y is cyano.*

*16. A compound according to claim 13 wherein Y is chloro.*

* * * * *

UNITED STATES PATENT OFFICE

CERTIFICATE OF CORRECTION

PATENT NO. : Re. 29,153

DATED : Reissued March 15, 1977

INVENTOR(S) : Wendell Gary Phillips

It is certified that error appears in the above-identified patent and that said Letters Patent are hereby corrected as shown below:

Claim 1, the formulae should read as follows:

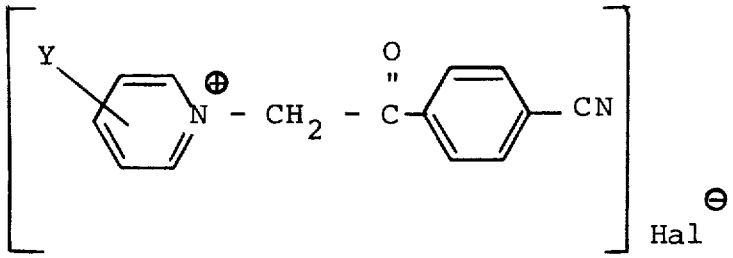

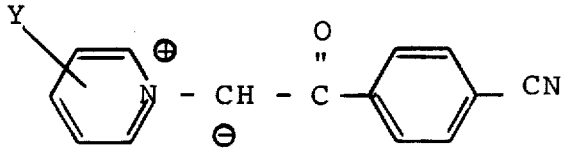

Signed and Sealed this

Fourteenth Day of June 1977

[SEAL]

*Attest:*

RUTH C. MASON
*Attesting Officer*

C. MARSHALL DANN
*Commissioner of Patents and Trademarks*